United States Patent [19]
Fridman

[11] Patent Number: 5,926,814
[45] Date of Patent: Jul. 20, 1999

[54] SYSTEM AND METHOD FOR PROCESSING A NEW CALENDAR SYSTEM

[75] Inventor: Natalio S. Fridman, New York, N.Y.

[73] Assignee: Consist International, New York, N.Y.

[21] Appl. No.: 08/934,715

[22] Filed: Sep. 22, 1997

[51] Int. Cl.⁶ .................................................. G06F 17/30
[52] U.S. Cl. ...................... 707/6; 707/1; 707/6; 707/100; 707/101; 707/102
[58] Field of Search ............................... 707/6, 101, 102, 707/100, 1

[56] References Cited

U.S. PATENT DOCUMENTS

| | | | |
|---|---|---|---|
| 5,596,554 | 1/1997 | Hagadorn | 368/82 |
| 5,600,836 | 2/1997 | Alter | 707/101 |
| 5,668,989 | 9/1997 | Mao | 707/101 |
| 5,719,826 | 2/1998 | Lips | 368/29 |
| 5,740,442 | 4/1998 | Cox et al. | 395/704 |
| 5,758,336 | 5/1998 | Brady | 707/6 |
| 5,761,668 | 6/1998 | Adamchick | 707/101 |
| 5,765,145 | 6/1998 | Masiello | 707/1 |
| 5,797,117 | 8/1998 | Gregovich | 707/101 |
| 5,806,067 | 9/1998 | Connor | 707/100 |
| 5,808,889 | 9/1998 | Burgess | 364/737 |
| 5,809,500 | 9/1998 | Nolan | 707/6 |
| 5,828,890 | 10/1998 | Rehbok et al. | 395/733 |
| 5,852,824 | 12/1998 | Brown | 707/6 |

FOREIGN PATENT DOCUMENTS

0527947  2/1993  Japan ........................................... 7/24

OTHER PUBLICATIONS

Bartlett, J., "Managing a year 2000 programme," IEE Half–Day Colloquium on Professionalism in Project Management (Digest No.: 1997/373), Nov. 1997, pp. 2/1–2/4.

Lynd, E. C., "Living with the 2–digit–year Year 2000 Maintenance using a procedural solution," International Conference on Software Maintenance, 1997 Proceedings, Oct. 1997, pp. 206–212.

Reed, S.J., "DLA's year 2000 remediation program: managing organization–wide conversion and compliance," International Conference on Software Maintenance, 1997 Proceedings., Oct. 1997, pp. 198–205.

Wei–Tek, Tsai, "Application of data–centered approach to Year 2000 problem," The Twenty–First Annual International Computer Software and Applications Conference, 1997. COMPSAC '97, Aug. 1997, pp. 287–288.

Primary Examiner—Wayne Amsbury
Assistant Examiner—Shahid Alam
Attorney, Agent, or Firm—Proskauer Rose LLP

[57] ABSTRACT

A system and method for selectively modifying date fields of a target application program processes date data converted from the Gregorian calendar to an inventive calendar system. Specifically, the system includes an identifying application program, an analyzing application program, a code generator and a processor. The identifying application program is interfaced with the target application program for identifying field source code representing each date field in the target application program. This is achieved by analyzing source code of the target application program. The analyzing application program analyzes each field source code to determine the number of year-digits available in each date field. The code generator modifies the analyzed field source code representing the date fields capable of accepting only two-digit years to modified source code representing date fields capable of accepting three-digit years. The processor replaces the analyzed field source code representing the two-digit year date fields with corresponding modified source code. In addition, the system may include an input for inputting Gregorian date data having two or four-digit years, a first subroutine program for interpreting the inputted Gregorian date data to generate a respective Gregorian calender year, and a second subroutine program for selectively converting each generated Gregorian calender year to a corresponding date data representing an inventive calender year having three-digit years.

14 Claims, 2 Drawing Sheets

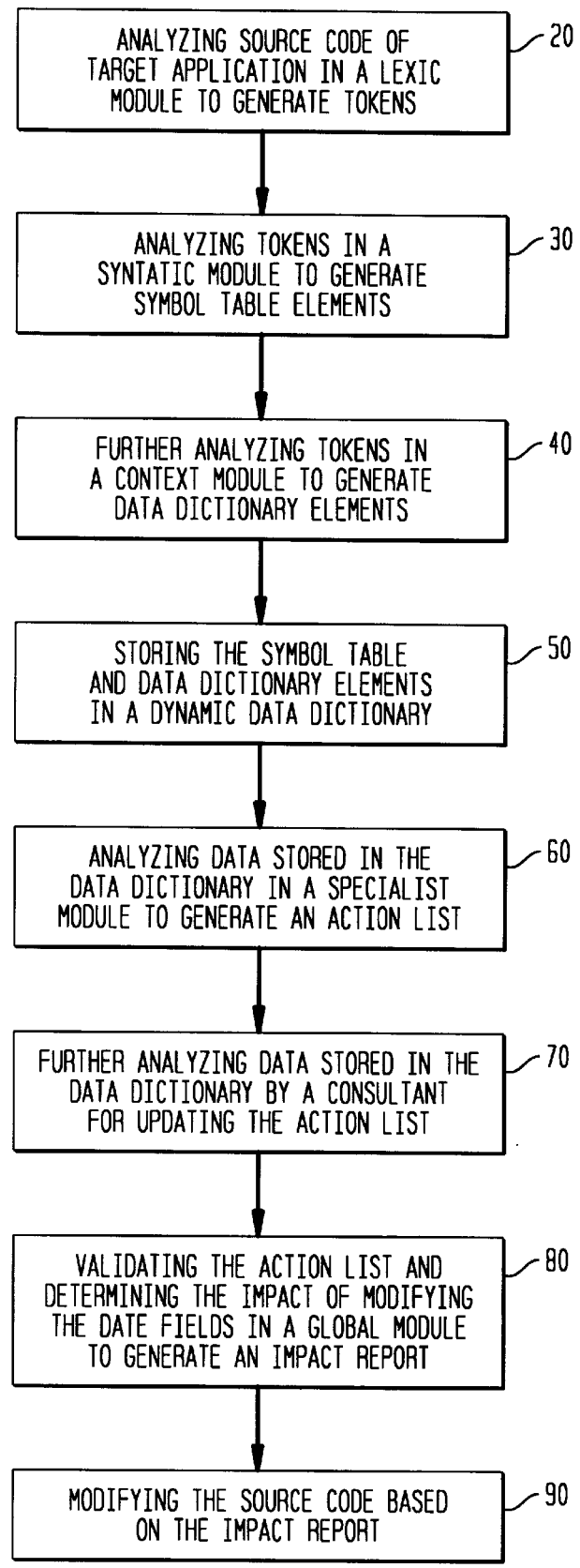

5,926,814

SYSTEM AND METHOD FOR PROCESSING A NEW CALENDAR SYSTEM

FIELD OF THE INVENTION

The invention relates generally to a system and method of selectively modifying date fields of an application program, and, more particularly, to a system and method of modifying date fields of the application program to accept converted date data having a three-digit year, where the converted date data is based on an inventive calendar system for solving the Year 2000 Problem.

BACKGROUND OF THE INVENTION

As Dec. 31, 1999 turns into Jan. 1, 2000, a man-made phenomenon having the potential of malfunctioning a majority of the world's microprocessors will occur. This occurrence is known as "the Year 2000 Problem," "Y2K" and "the Millennium Bug." In essence, many computers that process date data may either stop working or produce inaccurate results.

Basically, the Year 2000 Problem stems from a simple memory saving trick where programmers dropped the first two number of the date to save a byte of memory. For example, the year 1962 would be abbreviated to "62". Although with today massive memory devices saving a mere byte of data is insignificant, the practice began when every byte of computer storage was precious.

When the year 1999, abbreviated as "99", ends, and the year 2000, abbreviated as "00", begins, most of the world's software will be confused. For example, since the number "00" has a value less than the number "99", many computer programs will interpret the date as the year 1900.

The Year 2000 Problem will affect everything from power companies, modern automobiles, and weapon systems to banks, governmental offices, as well as large and small businesses throughout the world. As governments and companies began to realize the magnitude of this problem, thousands of computer consultants have been hired to fix the Year 2000 Problem. It has been estimated that the costs for fixing the Year 2000 Problem may exceed one trillion dollars.

One prior art solution for the Year 2000 Problem is found in U.S. Pat. No. 5,600,836 to Alter. This prior art reference proposes subtracting 20 or more years (e.g., 28 years) from all of the dates stored in the data files. Accordingly, the year 2000 would appear as the year 1972. However, although this solution may work if all of the date data is converted, it is dangerous to modify such raw data. This is true since it is difficult to ascertain what is date data vis-a-vis other type of data. For example, other numerical data, stored with date data in the data files, may be modified by subtracting 28 from it. One can imagine the catastrophic problems that can occur in such a situation.

It is therefore an object of the present invention to provide a solution to the Year 2000 Problem that is efficient in operation, without modifying previously stored date data.

It is a further object of the present invention to analyze and, if necessary, modify the source code representing date fields in an application program which processes the date data.

It is another object of the present invention to analyze and modify a target application program without affecting (i.e. freezing) the remaining system that contains numerous other application programs and data files.

Various other objects, advantages and features of the present invention will become readily apparent from the ensuing detailed description and the novel features which would be particularly pointed out in the appended claims.

SUMMARY OF THE INVENTION

These and other objectives are realized by a system and method for selectively modifying date fields of a target application program to assist in solving the Year 2000 Problem.

The system includes an identifying application program, an analyzing application program, a code generator and a processor. The identifying application program is interfaced with the target application program for identifying field source code representing each date field in the target application program. This is achieved by analyzing source code of the target application program.

The analyzing application program analyzes each field source code to determine the number of year-digits available in each date field. The code generator modifies the analyzed field source code representing the date fields capable of accepting only two-digit years to modified source code representing date fields capable of accepting three-digit years. The processor replaces the analyzed field source code representing date fields having two-digit years with corresponding modified source code.

As a further aspect of this invention, the system may include an input for inputting Gregorian date data having two or four digit years, a first subroutine program for interpreting the inputted Gregorian date data to generate a respective Gregorian calender year, and a second subroutine program for selectively converting each generated Gregorian calender year to a corresponding date data representing an inventive calender year, known as a Consist calendar year, having three-digit years. The second subroutine converts the generated Gregorian calendar year to the Consist calendar year based on the equation:

Consist calendar year=Gregorian calendar year−1900.

Accordingly, a Gregorian calendar year of, e.g., 2015 will be converted to a three-digit Consist calendar year of 115 (2015−1900). As a further example, a Gregorian calendar year of 1801 would be converted to a Consist calendar year of −99 (1801−1900). Under the condition that the Consist calendar comprises three digit years, the earliest date that can be converted in 1801 (using the "−" sign as digit).

As an additional aspect of this invention, the system processor further processes the converted date data in the modified target application.

Since only date fields of the application program unable to accept such three-digit year data are modified, the modification to the application is efficient with less risk of error. Further, date data previously stored in a data file is never modified, which eliminates the risk of erroneously modifying data that appears to be date data but is, in fact, other types of data. In addition, since the data files are not analyzed or modified, other application programs in a computer system are not frozen during the analysis and modification of the target application program. In other words, if the data files (which store date data, etc.) were analyzed and modified, then all application programs (not just the target application) that share the data files would be inoperative. Thus, utilizing the present invention, an entire computer system is not stalled (for possibly hundreds or thousands of hours), as is the case where the data files are modified to solve the Year 2000 Problem.

BRIEF DESCRIPTION OF THE DRAWINGS

The following detailed description, given in way of example and not intended to limit the present invention solely thereto, will best be understood in conjunction with the accompanying drawings in which:

FIG. 2 is a flow chart showing the steps for analyzing and modifying the source code of a target application in accordance with the present invention.

DETAILED DESCRIPTION OF THE PREFERRED EMBODIMENTS

Figure 1:
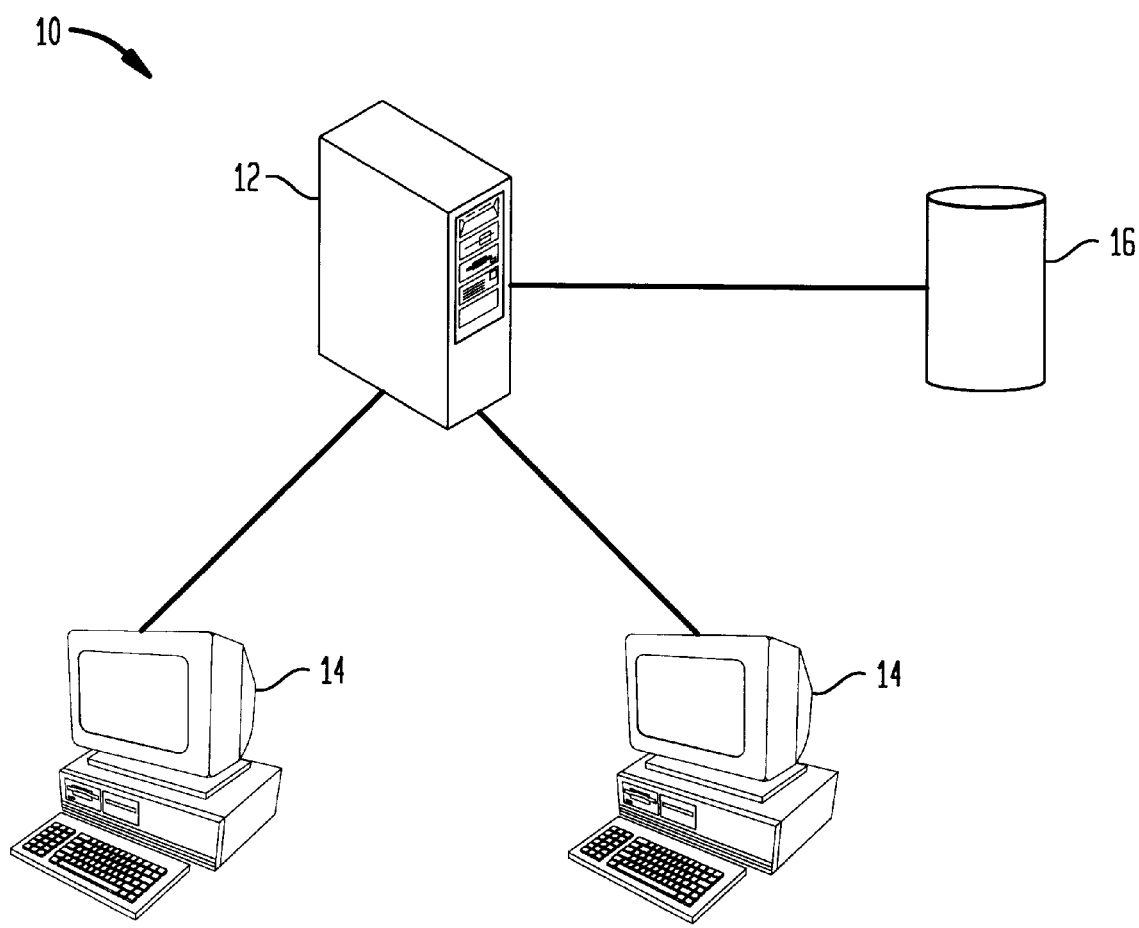
FIG. 1 schematically illustrates an exemplary computer system that may be utilized in the present invention.

FIG. 1 schematically illustrates a computer system 10 that may be utilized in the present invention. Note, however, that the present invention may be utilized in any system which runs an application program. The computer system 10 includes a server 12 connected to a plurality of clients 14, as well as to a storage device 16. Server 12 may also have a storage device residing therein (not shown) that may supplement or replace storage device 16. Note that server 12 may be any computer device, such as a mainframe computer, minicomputer, or microcomputer. Client 14 may be a standard desktop computer comprising a CPU, or may be a mere user terminal relying on the CPU of server 12. In addition, client 14 preferably includes inputs such as a keyboard, touch-sensitive monitor, and mouse. In an exemplary embodiment, it will be assumed that an application program is stored in a storage device included in server 12. Data, processed using the application program, is stored in memory device 16 (or also in the memory store residing in server 12). Users may access the application program using client stations 14. In particular, each user may access the data stored in storage device 16 or may input new data using a respective keyboard, a touch-sensitive monitor, a mouse, etc.

Typically, the application program will comprise thousands of lines of source code. The early standard for writing such applications (especially for businesses) utilized a programming language known as COBOL. More recently, however, programs have been written in Pascal, Natural, C++, Java, and the like. Commonly, imbedded in the numerous lines of source code (in any language) are data fields which, when needed, request corresponding data (e.g., from memory device 16) to fill the data fields for processing therein. The corresponding data includes character and numerical information, such as names, monetary amounts, and dates.

In the present invention, the source code of an application program will be analyzed to determine the location of each date field (data fields that accept date data). Date fields typically have a format that may accept two or four-digit year dates.

As previously stated, the majority of date fields only accept two-digit years. In addition, the date fields may be in a YY/MM/DD or MM/DD/YY format. As will be described in greater detail below, once the date fields in the application program are located, it is next determined whether the year field has enough bytes to accept at least a three-digit year. If not, the year field will be modified, i.e., expanded by one byte to accept a three-digit year. For example, the date fields will be modified to a YYY/MM/DD or MM/DD/YYY format.

In some instances, even when the year field is set up only to receive a two-digit year, there may already be space for three-digits. For example, when the data is stored or processed as "packed decimal" data, there will be room for a three-digit year.

This is true since packed decimal data inherently includes an extra digit space for indicating "+" or "−". However, when the data is stored or processed as "character" or "non-packed decimal" data, the year field will need to be modified to accept one extra byte of data.

The purpose of insuring that the year fields in the source code of the application program can accept three-digit years is that all year dates beyond the year 1999 will be converted, via a simple subroutine program, into a new three-digit calendar system, hereinafter referred to as the "Consist Calendar." Basically, the Consist Calendar is an inventive calendar system that follows the rules of the Gregorian Calendar with a difference of 1900 years. Accordingly, Jan. 1, 1900 of the Gregorian Calendar corresponds to January 1 of year 0 (i.e., year 000 in three-digit form) in the Consist Calendar. Similarly, Jan. 1, 2015 of the Gregorian Calendar corresponds with January 1 of year 115 of the Consist Calendar. As stated, a simple subroutine program can convert any inputted date of the Gregorian Calendar to the new Consist Calendar. The equation in which the software conversion is based on is as follows:

$$\text{Consist Calendar Year} = \text{Gregorian Calendar Year} - 1900. \quad (1)$$

Accordingly, if a user at client station 14 inputs the year 2139, the subroutine using equation (1) would subtract 1900 from 2139 and output the Consist Calendar year 239. This Consist Calendar year 239 can then be processed in the application program, previously modified to accept a three-digit year date.

Further, the subroutine program can be easily written to automatically convert any two-digit inputs that are less than a threshold number, as a year in the 21st century. For example, if the threshold number is set at 40, then inputting the number 29 will be interpreted as the year 2029. Subsequently, the subroutine program would convert that to year 129 of the Consist Calendar.

In addition, note that the data files, stored in memory device 16, should be analyzed to ensure that they can store three-digit year data therein.

An exemplary process for analyzing and modifying the source code of the application program will now be described in greater detail with reference to the flow chart of FIG. 2. In step 20, the source code of the target application program is analyzed in a "Lexic" module. The Lexic module is a program that defines words, identifiers, special characters and constants from the source code by comparing the source code with a "Lexic" dictionary. After each match is made between the source code and the Lexic dictionary, a "token" is generated.

In step 30, each token is analyzed in a "Syntatic" module. The Syntatic module compares each token to a language graph (syntax from a Syntatic dictionary) to generate "symbol table elements." Certain tokens will not be matched with the syntax in the Syntatic dictionary. When this occurs, the tokens are analyzed in step 40 using a "Context" module. The Context module analyzes the tokens according to its position in the source code to define the token for generating "data dictionary elements" therefrom.

In step 50, the symbol table and data dictionary elements are stored in a dynamic data dictionary. Thereafter, the data stored in the data dictionary are analyzed in a "Specialist" module, in step 60. This statistically generates an "action list" that includes possible year date fields that are unable to accept more than a two-digit year.

In step 70, the data stored in the dynamic data dictionary are analyzed by a human consultant. This step insures the accuracy of the action list and where errors occur, the consultant will update the list. At step 80, the action list is processed in a "Global" module that validates recommended modifications from the action list. Further, the Global module verifies the impact of the recommended modifications on the "global" computer system. An "impact report" is then generated from the Global module. Lastly, at step 90, the source code of the target application program is modified based on the impact report.

In essence, the Specialist module generates a list having the possible year date fields that are only able to accept two-digit years. This list is confirmed by a consultant. Accordingly, the source code will be modified to insure that three-digit year dates can be processed in the date fields. The Global module insures that expanding the date field to accept a third digit, when necessary, does not have an adverse effect on the system as a whole.

To summarize, an inventive calendar system is disclosed as a solution to the Year 2000 Problem. Further, date fields in the source code of the application program are analyzed and, as necessary, modified to accept the three-digit years of the inventive calendar.

While several embodiments have been chosen to illustrate the invention, it will be understood by those skilled in the art that various changes and modifications can be made herein without departing from the scope of the invention as defined in the appended claims.

What is claimed is:

1. A method of selectively modifying date fields of a target application program, comprising the steps of:

identifying field source code representing each date field in said target application program by analyzing source code of said target application program;

analyzing each of said field source code to determine the number of year-digits available in each said date fields;

modifying the analyzed field source code representing said date fields capable of accepting only two-digit years to modified source code representing date fields capable of accepting three-digit years; and replacing said analyzed field source code representing the two-digit year date fields with corresponding modified source code.

2. The method of claim 1, further comprising the steps of:

inputting Gregorian date data having two or four digit years;

interpreting the inputted Gregorian date data to generate a respective Gregorian calendar year; and selectively converting each generated Gregorian calendar year to a corresponding date data representing a Consist calendar year having a three-digit year.

3. The method of claim 2, wherein said step of converting converts said generated Gregorian calendar year to said Consist calendar year based on the equation:

Consist calendar year=Gregorian calendar year−1900.

4. The method of claim 3, further comprising the step of processing the Consist date data in the modified target application.

5. The method of claim 4, further comprising the step of storing the processed Consist date data in a memory capable of storing three-digit year data.

6. A system for selectively modifying date fields of a target application program, comprising:

an identifying application program, interfaced with said target application program, for identifying field source code representing each date field in said target application program by analyzing source code of said target application program;

an analyzing application program for analyzing each of said field source code to determine the number of year-digits available in each said date fields;

a code generator for modifying the analyzed field source code representing said date fields capable of accepting only two-digit years to modified source code representing date fields capable of accepting three-digit years; and a processor for replacing said analyzed field source code representing the two-digit year date fields with corresponding modified source code.

7. The system of claim 6, further comprising:

an input for inputting Gregorian date data having two or four digit years;

a first subroutine program for interpreting the inputted Gregorian date data to generate a respective Gregorian calendar year; and a second subroutine program for selectively converting each generated Gregorian calendar year to a corresponding date data representing a Consist calendar year having a three-digit year.

8. The system of claim 7, wherein said second subroutine converts said generated Gregorian calendar year to said Consist calendar year based on the equation:

Consist calendar year=Gregorian calendar year−1900.

9. The system of claim 8, wherein said processor further processes the Consist date data in the modified target application.

10. The system claim 9, further comprising a memory, capable of storing three-digit year data, for selectively storing the processed Consist date data therein.

11. A method of selectively converting date data having two or four year-digits representing Gregorian calendar years to date data representing a Consist calendar year, comprising the steps of:

interpreting the Gregorian date data to generate a respective Gregorian calendar year; and selectively converting the generated Gregorian calendar year to a corresponding Consist calendar year based on the equation:

Consist calendar year=Gregorian calendar year−1900.

12. The method of claim 11 further comprising the step of storing the converted Consist calendar year data in a memory capable of storing three-digit year data.

13. A system for selectively converting date data having two or four year-digits representing calendar years of the Gregorian calendar to date data representing a Consist calendar year, comprising:

a first subroutine program for interpreting Gregorian date data to generate a respective Gregorian calendar year; and a second subroutine program for selectively converting the generated Gregorian calendar year to a corresponding Consist calendar year based on the equation:

Consist calendar year=Gregorian calendar year−1900.

14. The system of claim 13 further comprising a memory, capable of storing three-digit year data, for selectively storing the converted Consist calendar year data therein.

* * * * *